(12) United States Patent
Maquaire

(10) Patent No.: US 6,178,376 B1
(45) Date of Patent: Jan. 23, 2001

(54) METHOD AND ARRANGEMENT FOR RECORDING AND USING GEOGRAPHIC DATA

(75) Inventor: Jean-Pierre Albert Maquaire, Nantes (FR)

(73) Assignee: MLR Electronique, Vallet (FR)

( * ) Notice: Under 35 U.S.C. 154(b), the term of this patent shall be extended for 0 days.

(21) Appl. No.: 09/258,768

(22) Filed: Feb. 26, 1999

(30) Foreign Application Priority Data

Feb. 27, 1998 (FR) .................................................. 98 02430

(51) Int. Cl.[7] .............................. G01C 21/00; G06G 7/78
(52) U.S. Cl. ........................ 701/200; 33/1 CC; 33/1 M; 33/1 MP; 33/1 C
(58) Field of Search ..................................... 701/200, 208, 701/213, 210; 33/1 C, 1 MP, 1 CC, 1 M

(56) References Cited

U.S. PATENT DOCUMENTS

| | | | |
|---|---|---|---|
| 4,506,336 | 3/1985 | Hird | 364/518 |
| 4,835,870 | 6/1989 | Rauch et al. | 33/138 |
| 4,922,618 | 5/1990 | Osborn et al. | 33/1 MP |
| 5,115,569 | * 5/1992 | Kubo . | |
| 5,442,559 | * 8/1995 | Kuwahara et al. | 701/208 |
| 5,444,618 | * 8/1995 | Seki et al. | 702/5 |
| 5,551,161 | * 9/1996 | Kubo | 33/503 |
| 5,731,978 | * 3/1998 | Tamai et al. | 701/201 |
| 5,774,362 | * 6/1998 | Suzuki et al. | 701/208 |
| 5,808,598 | * 9/1998 | Nakatani et al. | 345/123 |

FOREIGN PATENT DOCUMENTS

WO 87/01442   3/1987   (WO) .

OTHER PUBLICATIONS

English Language Derwent Abstract of DE 44 34 868.
Patent Abstracts of Japan, vol. 017, No. 438 (P–1591), Aug. 12, 1993 and Japan 05 093620 (Aisin Seiki Co. Ltd), Apr. 16, 1993.
Derwent WPI Acc No. 96–189198/199620, English–language abstract for DE 44 34 868.

* cited by examiner

Primary Examiner—William A. Cuchlinski, Jr.
Assistant Examiner—Olga Hernandez
(74) Attorney, Agent, or Firm—Pennie & Edmonds LLP

(57) ABSTRACT

A method of recording, into a data base of a navigation and positioning system, of geographic data of geographic places selected in a predetermined geographic zone, by selecting two points on a geographic map of said zone, defining these points by their geographic co-ordinates and by their position co-ordinates on the map, establishing the relationship between the geographic and position co-ordinates, defining the points to be recorded by their position co-ordinates, calculating for these position co-ordinates from the relationship, the geographic co-ordinates and entering the latter into the data base.

15 Claims, 2 Drawing Sheets

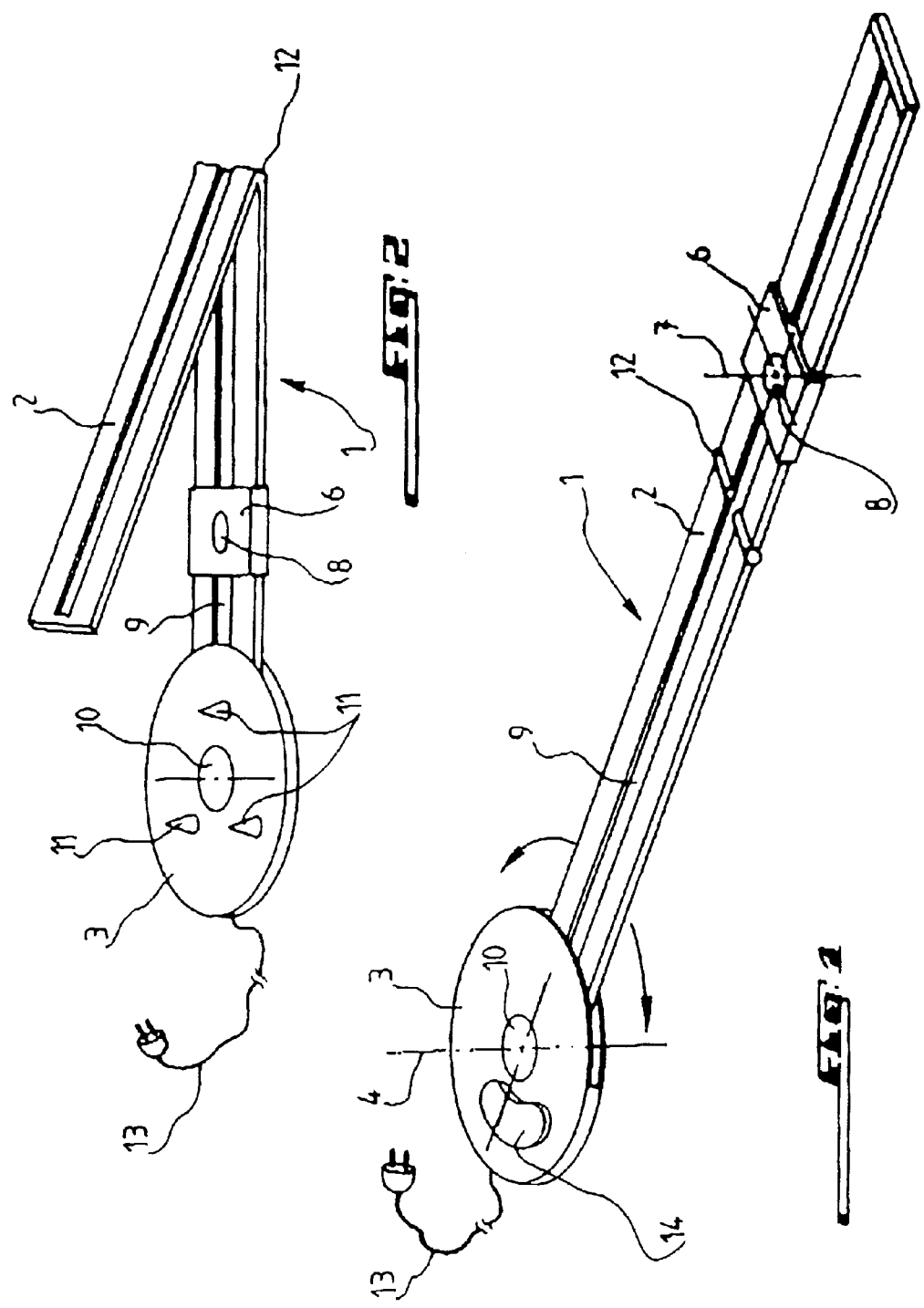

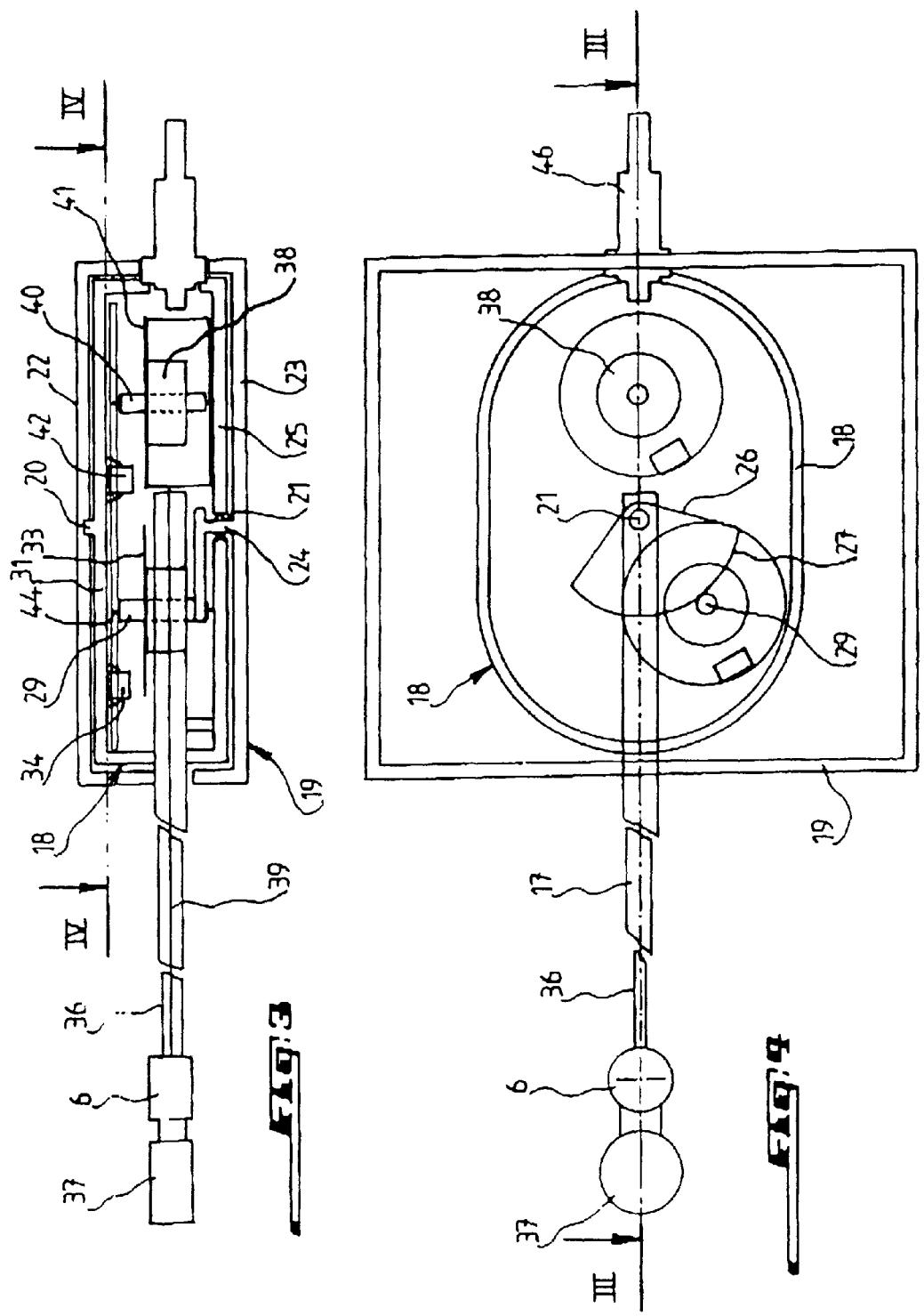

METHOD AND ARRANGEMENT FOR RECORDING AND USING GEOGRAPHIC DATA

TECHNICAL FIELD

The invention relates to a method of recording into a storage, in particular of a navigation and positioning or a locating system, of geographic data of geographic places such as the points or spots of an itinerary or route in a predetermined geographic zone and an arrangement for bringing this method into operation.

BACKGROUND ART

The navigation and positioning or locating systems owing to their digital bases of geographic data of a given geographic zone are conceived or designed for guiding their users along a pre-established itinerary or route and for checking the accuracy of their positions during a displacement or travel.

One already knows methods and arrangements of the type defined hereinabove which allow a user to add his own personal data such as a fishing pots or zones for a seaman or sailor, restaurants interesting for a motorist, monuments along a pre-established itinerary or route, mushrooms or flowers zones for a tripper, walker or excursionist.

The known method and arrangements are based upon the use of a digitalizing table or of an electronic map recorded in an appliance or device on which the user would electronically plot the points or spots he wishes to define.

Now these known methods and arrangements exhibit the major inconvenience that a digitalizing table or an electronic map to be used is cumbersome or bulky and heavy and therefore usable with difficulty for many leisure or spare time utilizations where it is mandatory to have the lightest possible equipment available and for professional utilizations requiring a minimum bulkiness or size.

SUMMARY OF THE INVENTION

The object of the present invention is to provide a method and an arrangement of the kind defined hereinabove which would cope with the inconveniences of the state of prior art.

To reach that goal, the method according to the invention includes the steps of selecting two points on a geographic map of the geographic zone in which points corresponding to geographic places or spots should be indicated, defining these points by their geographic co-ordinates such as their longitude and their latitude and by their co-ordinates of position on the map, establishing the correlation between the geographic and position co-ordinates, defining the points to be recorded by their position co-ordinates, calculating from these position co-ordinates the geographic co-ordinates from or according to the correlation and entering the calculated geographic co-ordinates into the said storage.

The arrangement for bringing the process into operation is characterized in that it comprises a device for establishing a system of polar co-ordinates on a geographic map and for establishing the polar co-ordinates of the points lying on the map in this system, a recording device for the recording by the user of geographic co-ordinates and for receiving polar coordinates and calculation means adapted for calculating, for polar co-ordinates, the geographic co-ordinates.

BRIEF DESCRIPTION OF THE DRAWINGS

The invention will be better understood and further objects, characterizing features, details and advantages thereof will appear more clearly as the following explanatory description proceeds with reference to the attached diagrammatic drawings given by way of non limiting examples only illustrating several presently preferred specific embodiments of the invention and in which:

FIG. 1 is a diagrammatic perspective view of an arrangement according to the invention;

FIG. 2 shows the arrangement according to FIG. 1 in the folded-back state;

FIG. 3 is a view in section taken upon the line III—III of FIG. 4 of a second embodiment according to the invention; and FIG. 4 is a view in section taken along the line IV—IV of FIG. 3.

DETAILED DESCRIPTION OF THE INVENTION

The arrangement according to the invention, which allows its user to enter, into a digital geographic data base, additional data for personalizing the content of the bases, essentially comprises a pivoting electronic rule 1 comprising a rule element 2 mounted onto a circular base 3 pivoting about a central axis and a sight device 6 provided as a slider, runner or like traveller axially displaceable on the rule element 2. The point of sight 7 of the sight slider appears in the center of a window 8 and the rule element 2 comprises a longitudinal slot 9 in order that, when the rule is placed upon a geographic map, the latter be visible through the window 8 in any axial position of the slider on the rule element 2. The base 3 also comprises, about the axis of rotation 4, a window shown at 10 in order that the map be visible through this window.

As shown on FIG. 2, the bottom face of the base 3 carries spikes 11 which permit to hold the pivoting rule 1 against motion on the map. This figure moreover shows that the rule element 2 may be folded back about a hinge 12 to reduce its cumbersomeness. The rule could of course be provided so as to be extensible.

The pivoting rule 1 further comprises an electronic device which permits the measurement of the distance of the movable sight point 7 from the pivot axis 4 and of the angle of pivoting of the rule element. This device thus is capable of defining points which appear in the sight 7 as polar co-ordinates in a system of polar co-ordinates of which the origin is located on the pivot axis 4. The electronic device would measure the angle and the distance of the sight points in this system.

The pivoting electronic rule 1 is advantageously used with a navigation and positioning or locating apparatus (not shown) into the digital base of geographic data of which will be entered the geographic points chosen by the user. The data recording device of this apparatus 1 serves as an interface means of dialogue between the navigation apparatus and the pivoting electronic rule owing to its alphanumerical keyboard and its screen. For that purpose, the rule is provided with a means for connection with the recording device, which could consist of an electric power-cord 13 as in the example shown, an infrared connection or a radio or whireless connection. Of course, the arrangement according to the invention further comprises a software for the management of the user and dialogue interface between the rule and the recording device.

The circular base 3 of the rule 1 is further provided a with a member 14 for the transfer, to the recording device, of the measured polar co-ordinates. In the example shown, this member consists of a push-button.

The operation and utilization of the arrangement according to the invention will be described hereinafter.

If the user wishes to personalize the geographic data bases of his navigation and positioning apparatus, he lays the geographic map of the geographic region involved down upon a flat or nearly flat surface such as a table, a wall, a ground or floor and places the pivoting electronic rule 1 according to the invention upon the map. The rule will be held against motion thereon with the assistance of the fastening spikes 11.

Before proceeding with entering the desired geographic points into the digital base, the user should at first enter into the recording device by means of the alphanumerical keyboard, the geographic co-ordinates, i.e. the longitude, the latitude of two points of the map. He should enter the co-ordinates of the point lying on the pivot axis 4 and forming the origin of the polar system and those of any point remote from the pivot axis, for example of a point located, with respect to the axis, on the other side of the data zone to be recorded. By means of the rule 1, by positioning the slider 6 upon or above this second point, one also establishes the position co-ordinates on the map The recording button permits to transfer these data to the recording device so that the software may establish the correlation between the geographic and position co-ordinates of both reference points by establishing the scale of the map and the initial polar angle with respect to the geographic North.

Then the user may automatically enter any point, trace, particular line, particular zone of his map which he desires to record by placing the sight slider 6 upon or above the desired point and by operating the transfer of the polar co-ordinates of these points to the recording device by actuation of the recording button. Owing to the correlation previously established, the software is capable of then converting the polar co-ordinates into geographic co-ordinates which will then be recorded into the digital data base of the navigation and positioning apparatus.

FIGS. 3 and 4 show another embodiment of the arrangement according to the invention. In this embodiment, the electronic rule is provided by a telescopic rod 17 mounted in stationary relationship at one end within a flat box 18 of oval shape and itself rotatably mounted in an outer casing 19 through the medium of top and bottom pivots designated at 20 and 21, respectively. The casing is adapted to be held against motion upon a geographic map for example by means of spikes (not shown) like the spikes 11 of the first embodiment. The upper pivot 20 consists of a stud projecting from the top face 31 of the box and engaging a suitable hole formed in the internal face of the top wall 22 of the outer casing 19. The bottom pivot 21 projects from the internal face of the bottom wall 23 of the casing 19 and extends through an opening 24 in the centre of the bottom wall 25 of the box 18 and carries at its free end a toothed sector or segment gear 26 with an angular extension of 120°. This sector therefore lies inside of the box 18. The toothing on the arcuate face 27 of the sector 26 meshes with a pinion 29 which is freely rotatably mounted within the box 18 while being carried by the lower wall, 25 and the upper wall 31, respectively, of the box. The pinion 29 carries a disk 33 which is provided at its periphery with measuring scale elements permitting a measuring sensor 34 fastened underneath the internal face of the top wall 31 of the box 18 to measure the angle of rotation of the box and thus of the telescopic rod 17. The co-operation of the sector 26 and of the pinion 29 permits to measure, with a very great precision or accuracy, the angular positions of the telescopic rod 17 owing to the step-up effect which these parts provide.

This telescopic rod comprises, as being fastened at the free end of the telescopic end element 36, a sight member forming the slider 6 of the first embodiment, which is displaceable along the axis of the rod. This end is further provided with a member forming a handle or grip 37 for the manipulation of the rod. The length of the rod is measured by names of a cable 39 of which one end is fastened to the telescopic end element 36 whereas the other end is wound about a drum 38 rotatably mounted within the box 18 through the medium of a pin or shaft 40 against a return spring. The drum is made fast to for unitary rotation with a disk 41 which comprises at its periphery elements forming a scale and which permit the measurement of the angle of rotation of the disk as well as of the drum by means of an optical sensor 42 mounted onto the internal face of the top wall 22 of the box 18 at the level of the periphery of the disk 41. The measured angle of rotation is representative of the length of the rod. Upon the bottom face of the top wall is also mounted a plate with printed circuits 44 which carries the electronic components for the processing of the data supplied by both sensors with a view to determining the polar co-ordinates of the different points lying on the map and of which the geographic co-ordinates are desirably to be entered into the data base. The output terminals of the electric circuits of the map are electrically connected to an outer cable through the medium of a connector 46 mounted in the peripheral wall of the outer casing 19.

What is claimed is:

1. An arrangement for carrying out a method of recording, into a database in particular of a navigation and a positioning system, of geographic data of geographic places selected in a predetermined geographic zone, consisting in selecting two points on a geographic map of the zone, defining the points by their geographic coordinates by longitude and latitude and by their position coordinates on the map, establishing the correlation between the geographic and position coordinates, defining the points to be recorded by their position coordinates, calculating, for these position coordinates, according to the correlation, the geographic coordinates and entering the geographic coordinates thus calculated into the database, the arrangement comprising a device for establishing a system of polar coordinates on a geographic map and of establishing polar coordinates of the points located on the map in this system, a recording device for the user's entering the geographic coordinates and receiving the polar coordinates and calculation means adapted to calculate, for polar coordinates, the geographic coordinates of these points.

2. A system for navigation and for positioning geographic data of geographic places such as points of an itinerary in a predetermined geographic zone, comprising a navigation and positioning apparatus provided with a geographic database and with a data entering device: an arrangement for carrying out a method of recording, into a database in particular of a navigation and a positioning system, of geographic data of geographic places selected in a predetermined geographic zone, consisting in selecting two points on a geographic map of the zone, defining the point by their geographic coordinates by their longitude and their latitude and by their position coordinates on the map, establishing the correlation between the geographic and position coordinates, defining the points to be recorded by their position coordinates, calculating, for these position coordinates, according to the correlation, the geographic coordinates and entering the geographic coordinates thus calculated into the database, the arrangement comprising a device for establishing a system of polar coordinates on a geographic map and of establishing polar coordinates of the points located on the map in this system, a recording device for the user's entering the geographic coordinates and receiving the polar coordinates and calculation means adapted to calculate, for polar coordinates, the geographic coordinates of these points; and a dialogue interface between the apparatus and the device for establishing a system of polar coordinate on a geographic map and for establishing polar coordinate of points lying on the images, comprising the aforesaid recording device and a software for the conversion of the measured polar coordinates into geographic coordinates, the data entering device of the apparatus forming the means for entering the geographic data of the aforesaid reference points.

3. A positioning system comprising:
- a device for establishing a system of polar coordinates on a geographic map and for establishing polar coordinates of points located on the map;
- a recording device for entering the geographic coordinates and for receiving the polar coordinates; and
- calculation means to calculate the geographic coordinates of the points of polar coordinates;
- wherein the device for establishing a system of polar co-ordinates includes a pivoting electronic rule (1) comprising a rule element (2, 17) mounted for pivoting about a base (3, 19) to be held against motion upon the map and of which the pivot axis defines the origin of the system of co-ordinates, a data slider (6) axially displaceable on the rule element or along the axis thereof and a device for the measurement of the polar co-ordinates of the points lying within the sight (7) of the slider (6).

4. An arrangement according to claim 3, wherein the device for the measurement of the polar co-ordinates is a device for the measurement of the angle of the rule (2) and of the distance of the sight point (7) of the slider (6) from the axis of rotation of the rule.

5. An arrangement according to claim 3, wherein the rule (2) comprises at least two parts pivotally connected to each other about a pivot axis (12) perpendicular to the longitudinal direction of the rule, both parts being foldable back upon each other.

6. An arrangement according to claim 3, wherein the rule is extensible for varying its length.

7. An arrangement according to claim 3, comprising software for the conversion of the measured polar co-ordinates into geographic co-ordinates.

8. An arrangement according to claim 3, wherein the electronic rule (1) comprises means (13) for connection to the recording device and selected from the group comprising a cable, an infrared connection or a radio-connection.

9. The positioning system of claim 3 further comprising software for converting the polar coordinates into geographic coordinates.

10. A method of operatively using the system according to claim 9 for entering a geographic point lying on a geographic map into the aforesaid data base of the navigation apparatus, comprising the steps of laying the geographic map comprising the geographic point to be entered down upon a substantially flat surface, placing the pivoting electronic rule (1) upon the map, entering by the entering device the geographic data of two reference points located on the said map, also establishing the position co-ordinates of these two reference points by the electronic rule (1) by placing the sight point of the slider upon each one of the points, operating the transfer of the position co-ordinates measured by the rule into the recording device, entering the position co-ordinates of the point, to be entered into the recording device, by the rule and by actuation of the transfer member, and causing the software to establish the geographic co-ordinates of this point and to enter them into the data base.

11. An arrangement according to claim 3, comprising means for entering the geographic data of the reference points into a recording device and means (14) for the transfer of the geographic data measured by the rule into the recording device.

12. An arrangement according to claim 11, wherein the transfer means are means operable by the user of the rule, such as a push-button mounted onto the base (3, 14) of the pivoting electronic rule (1).

13. An arrangement according to claim 3, wherein the electronic rod is a telescopic rod (17) carrying at its end a sight element (6) forming a sight slider and of which the length is measurable by means of a cable (39) made fast to the sight element and wound about a drum (38) of which the angle of rotation is measured by means of a measuring sensor.

14. An arrangement according to claim 13, comprising a device for the measurement of the angle of rotation of the telescopic rod which comprises a sensor (34) for measuring the angle of rotation and a step-up gear (26–29) for increasing the precision of measurement.

15. An arrangement according to claim 14, wherein the drum (38), the gear (26–29) and the sensors (42, 34) are enclosed within a box (18) to which the telescopic rod (17) is made fast and which is rotatably mounted within an outer casing (19) which may be held against rotation upon the geographic map.

* * * * *